United States Patent [19]

Magnasco

[11] Patent Number: 5,141,027
[45] Date of Patent: Aug. 25, 1992

[54] DUAL CONTROL STEM VALVE

[76] Inventor: Peter L. Magnasco, 3052 Colonial Way #8, San Jose, Calif. 95128

[21] Appl. No.: 647,150

[22] Filed: Jan. 29, 1991

[51] Int. Cl.⁵ ............................................. F16K 1/04
[52] U.S. Cl. ............................ 137/614.17; 251/122; 251/335.3
[58] Field of Search ................. 137/614.17; 251/122, 251/335.1, 335.3

[56] References Cited

U.S. PATENT DOCUMENTS

| | | | |
|---|---|---|---|
| 779,357 | 1/1905 | Gardner | 137/637.4 |
| 865,318 | 9/1907 | Roberts | 137/637.4 |
| 1,478,584 | 12/1923 | Schweinert | 137/614.17 |
| 3,870,080 | 3/1975 | Landwehr | 137/614.17 |
| 4,064,908 | 12/1977 | Loe | 137/614.17 |
| 4,175,726 | 11/1979 | Richards | 251/315 |
| 4,311,170 | 1/1982 | Dolan | 137/614.17 |
| 4,313,466 | 2/1982 | Adams | 137/614.17 |
| 4,414,999 | 11/1983 | Basta | 137/614.17 |
| 4,687,180 | 8/1987 | Simonelli | 251/122 |

*Primary Examiner*—A. Michael Chambers

[57] ABSTRACT

A dual control stem valve, to be universally installed for the staged control of a flow of matter facilitating; a valve body having a readily couplable inlet port and outlet port, the valve body having a primary bore connecting a primary valve seat arrangement, the primary bore receiving a rotatably positionable primary valve stem comprising an impassable valve end optionally communicatable to the primary valve seat arrangement, whereupon, when communication of the valve end of the primary valve stem to the primary valve seat arrangement is made the flow of matter is positively terminated from continuing further enabling absolute initial control of the continuance of flow, the primary valve stem having within a secondary stem bore connecting a secondary valve seat arrangement, the secondary stem bore receiving an independent secondary valve stem comprising a valve end rotatably positionably communicatable to the secondary valve seat arrangement enabling the rate of flow to be separately variably controlled, and accordingly, be immediately continually reinstated at a similar flow rate.

7 Claims, 2 Drawing Sheets

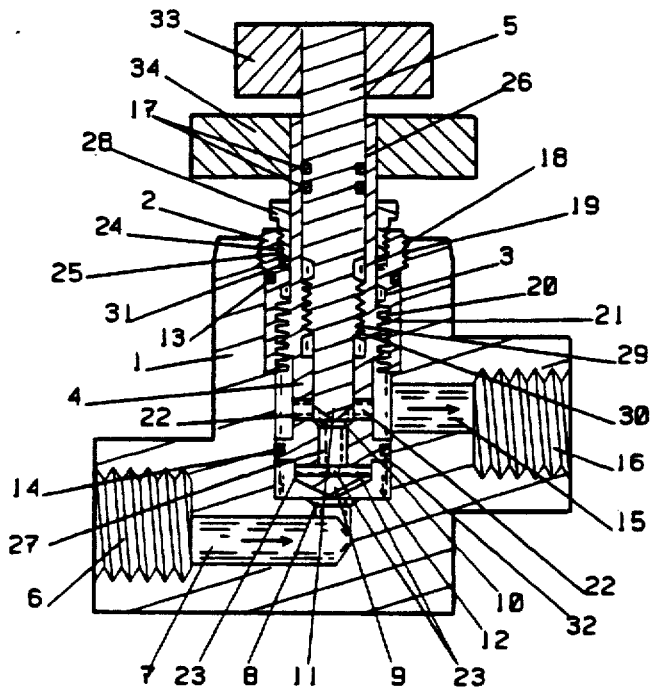
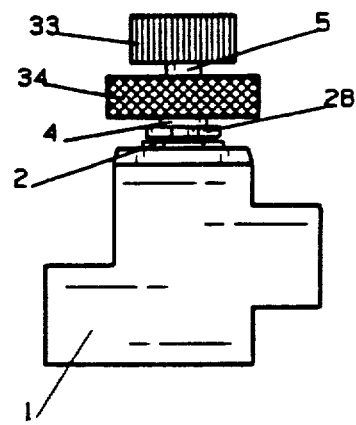
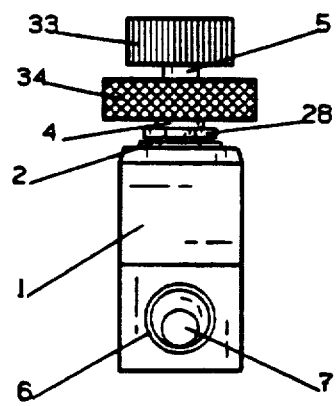
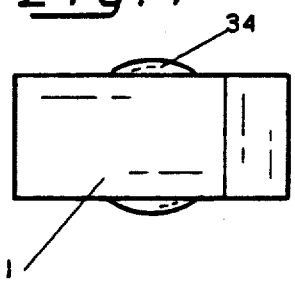
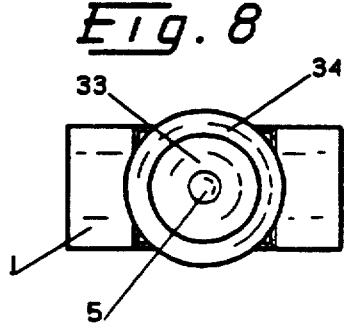

DUAL CONTROL STEM VALVE

BACKGROUND

1. Field of Invention

The Dual Control Stem Valve disclosed herein relates to hand valves, and consists in the unconventional construction of the valve, and its distinct operation, and further, in the novel arrangement and combination of its parts, as more fully hereinafter set forth.

It is commonly known by many if not most people knowledgeable in the art that hand operated stem valves may be generally characterized as having either a coarse operating action, that is fast in initiating and terminating flow, which is usually rather difficult to adjust to a more precise desired rate of flow, or a fine gradual operating action, that is difficult by which to rapidly initiate or terminate flow, but which is well suited for metering a more precise specific desired rate of flow. As may be commonly experienced during operation, once ongoing flow has been terminated, varying degrees of difficulty are usually encountered in reinstating a similar desired rate of flow to that having been previously instituted during operation, as may be immediately necessary for a particular operation, when flow is resumed.

Therefore, it is the intent of the present invention to provide a stem valve combining the more desirable previously mentioned operating characteristics of enabling rapid initiation or termination of flow, in combination with more precise metering capability of the rate of flow, and also enable a previously desired rate of flow may be similarly immediately reinstatable upon resumption, to eliminate or substantially reduce the difficulty normally experienced in reobtaining a similar desired rate of flow as may be immediately necessary, when ongoing flow has ben terminated and is then resumed, the principals of which becoming increasingly apparent as they are more fully disclosed in the following specification.

2. Description of Prior Art

Heretofore, a variety of hand operated valves have been provided, possessing to at least a reasonable degree, some of the operating characteristics similar to those briefly described.

One such valve type incorporates a spherical ball shaped core as a method of control, and according to rotational axial positioning, of the core, within the valve body, flow is initiated or terminated. Most often, an advantage in the utilization of this valve type is the ability to control rapid initialization, or termination, of full flow through the valve, however, considerable control difficulty is usually encountered in obtaining an exact, precise, metered adjustment, of the rate of flow passing through the valve, which may be necessary on some applications.

And another such valve type utilizes a needle core as a method of control, and according to adjustment of the core, readily provides exact, precise, metered control of the rate of flow passing through the valve. This valve type, conversely, is usually much slower to initiate or terminate flow through the valve, making it undesirable for use on applications that require rapid initialization or termination of flow.

And still another such valve type utilizes a tapered core for the primary control of flow and a needle member residing within the tapered core for secondary control of flow. The valve is one among several other members of a larger device and is specifically designed and intended to support the rather unique operating characteristics inherent to the overall operation of the larger device. Were if separated therefrom, the valve could not be readily utilized in a common manner to provide control of a pressure flow due to either its distinct structural design, or its dependance upon other members being a part of the larger device, or the unique operating conditions inherent of the larger device.

And still yet another such valve type similarly utilizes a tapered core for its primary Flow control having a needle residing within the core providing secondary control of flow. The primary control of flow through the valve, as provided by the tapered core, is accessible and readily operable, however, the secondary control of flow is normally inaccessible suggesting that once it is positioned it is intended to remain as positioned for an extended period of time, so as the initiation of flow is commonly usually controlled by the sole positioning of the tapered core and the more precise metering of flow is not commonly reset.

SUMMARY

Presently, these valves have not been discovered to possess the capability to rapidly initiate or terminate ongoing flow in combination with the ability of readily adjusting the rate of flow of matter passing through the valve and also enable a similar desired rate of flow to that having been instituted during the coarse of operation may be immediately reobtained upon a subsequent resumption in flow after ongoing flow has been terminated, when flow is resumed.

OBJECTS AND ADVANTAGES

Accordingly, I claim as the objects and advantages of the invention:

To provide a dual control stem valve, facilitating; essentially rapid initiation and termination capability of ongoing flow, in combination with more precise adjustment capability of the rate of flow passing through the valve, enabling a previously desired rate of flow may be immediately similarly reinstatable upon a resumption of flow, after ongoing flow has been terminated and is then resumed, having a coarse stem control, and a fine stem control, being easily accessible and readily adjustable, and adequately independent in operation from the other enabling operation of the coarse stem control, while the fine stem control may remain substantially undisturbed.

In addition, I claim the following as additional objects and advantages:

To provide such a valve, to alleviate the difficulty encountered in reinstating a similar desired rate of flow to that having been previously instituted during operation, after ongoing flow has been terminated, when flow is resumed.

To provide such a valve, to eliminate the necessity to reset the valve to a desired similar rate of flow, after the ongoing flow of matter through the valve has been terminated, when flow is resumed.

To provide such a valve, assuring a similar rate of flow to that instituted during the coarse of operation may be immediately repeatable and continually reinstatable.

These together with other objects and advantages, which will become subsequently apparent, are more fully hereinafter described and claimed and reside in the following description and accompanying drawings.

DRAWING FIGURES

FIG. 1 is a perspective view.
FIG. 2 is a rear view.
FIG. 3 is a cross-sectional view taken substantially on a plane passing along line 3—3 in FIG. 2.
FIG. 4 is a cross-sectional view taken substantially on a plane passing along line 4—4 in FIG. 2.
FIG. 5 is a side view, the opposite side being a mirror image.
FIG. 6 is a front view.
FIG. 7 is a bottom view.
FIG. 8 is a top view.

DRAWING REFERENCE NUMERALS

| | |
|---|---|
| 1. Valve Body | 2. Sleeve |
| 3. Stop | 4. Primary Valve Stem |
| 5. Secondary Valve Stem | 6. Inlet Port |
| 7. Inlet Passageway | 8. Primary Valve Seat |
| 9. Valve End | 10. Secondary Valve Seat |
| 11. Valve End | 12. Primary Bore |
| 13. O-Ring | 14. O-Ring |
| 15. Outlet Passageway | 16. Outlet Port |
| 17. O-Rings | 18. Inner Threads |
| 19. Outer Threads | 20. Inner Threads |
| 21. Outer Threads | 22. Outlet Bore |
| 23. Inlet Bore | 24. Inner Threads |
| 25. Outer Threads | 26. Secondary Stem Bore |
| 27. Transfer Bore | 28. Packing Nut |
| 29. Inner Threads | 30. Outer Threads |
| 31. Packing Material | 32. Ridge Fence |
| 33. Stem Handle | 34. Stem Handle |
| 35. Generally Designates The Device | |

DETAILED DESCRIPTION OF THE INVENTION

Figure 1:
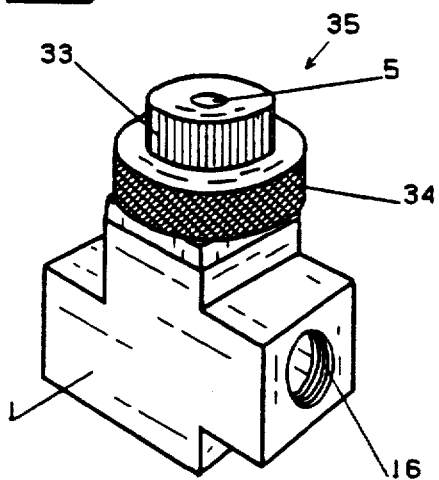
Figure 2:
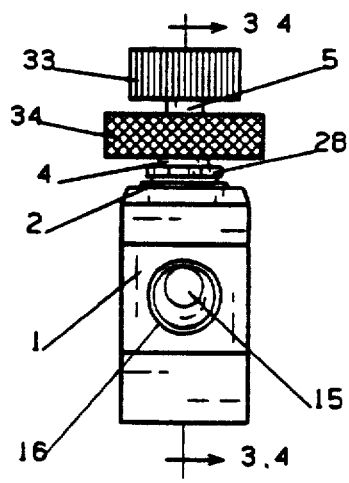

The preferred embodiment of the present invention is generally set forth herein and shown in the accompanying drawings, and further defined by the drawing numerals, with attention now invited to FIG. 1, of the accompanying drawings, a Dual Control Stem Valve 35, is shown including; a Valve Body 1, having top, bottom, side, and slightly offset opposite end portions, with one end portion having a Inlet Port 6, with attention also invited to FIG. 6, of the accompanying drawings, which is threaded to accept a conduit, and the other end portion having a Outlet Port 16, which is also threaded to accept a conduit, with attention now also invited to FIG. 4, of the accompanying drawings, a substantially elongated cylindrical Primary Bore 12, being generally centrally located within the Valve Body 1, extends from the top surface, thereof, linearally downward until near midway slightly narrows and continues into the lower portion of the Valve Body 1, to termination at the bottom, having a hollow Primary Valve Seat 8, therein, which has a bevelled inner edge, with communication being provided, thereto, by a Inlet Passageway 7, communicating the Inlet Port 6, to the Primary Valve Seat 8, a cylindrical hollow Sleeve 2, having Outer Threads 18, engaged to Inner Threads 19, of the Primary Bore 12, resides within the upper portion of the Primary Bore 12, on O-Ring 13, is recessed into the outer circumference of the Sleeve 2, communicating the upper interior wall of the Primary Bore 12, providing a pressure seal, the lower portion of the Sleeve 2, having Inner Threads 20, being so as a cylindrically elongated Primary Valve Stem 4, having Outer Threads 21, beginning some distance from the top ranging to midway along, may be rotatably accepted within the Sleeve 2, the Inner Threads 20, of the Sleeve 2, being so as the Primary Valve Stem 4, may be positioned and repositioned the full extent thereof, a Stop 3, being so as rotational movement of the Primary Valve Stem 4, may be governed within the Sleeve 2, the upper portion of the Primary Valve Stem 4, outwardly accessibly protrudes from the top of the Sleeve 2, having an affixed Stem Handle 34, thereon, a hollow Packing Nut 28, having Outer Threads 25, being engaged by Inner Threads 24, of the Sleeve 2, is employed to provide a pressure seal to the outwardly exposed portion of the Primary Valve Stem 4, using Packing Material 31, within the upper area of the Sleeve 2, the lower portion of the Primary Valve Stem 4, being received into the lower portion of the Primary Bore 12, having a diametrically enlarged Ridge Fence 32 member, with a O-Ring 14, recessed into the circumference communicating the Primary Bore 12, wall to seal and resolutely divide the area of the lower portion of the Primary Bore 12, into separate singular portions composing chambers, the Primary Valve Stem 4, continuing beyond the Ridge Fence 32 member, until termination having a Valve End 9, which is conically formed, the Primary Valve Stem 4, having within an accessible cylindrical Secondary Stem Bore 26, extending nearly the full length, thereof, having Inner Threads 29, beginning near midway and extending some distance until the Secondary Stem Bore 26, diametrically narrows and continues to termination at a hollow Secondary Valve Seat 10, which has a bevelled inner edge, the Secondary Stem Bore 26, being to rotatably accept and receive a elongated cylindrical Secondary Valve Stem 5, having Outer Threads 30, continuing from midway along to where the Secondary Valve Stem 5, diametrically narrows and continues to terminate having a Valve End 11, which is also conically formed, the Secondary Valve Stem 5, being accessibly outwardly exposed from the top of the Secondary Stem Bore 26, and having a Stem Handle 33, thereon, and having a pair of O-Rings 17, recessed into the circumference of the upper portion communicating the Secondary Stem Bore 26, upper wall, the Inlet Port 6, communicating to the Primary Valve Seat 8, the Primary Valve Seat 8, accessing one singularly divided portion of the Primary Bore 12, the Primary Bore 12, therefrom communicating a series of lateral Inlet Bores 23, residing within the Primary Valve Stem 4, between the Ridge Fence 32 member, and the Valve End 9, of the Primary Valve Stem 4, the Inlet Bores 23, communicating to a Transfer Bore 27, within the Primary Valve Stem 4, the Transfer Bore 27, communicating the Secondary Valve Seat 10, the Secondary Valve Seat 10, accessing the Secondary Stem Bore 26, where a series of lateral Outlet Bores 22, residing within the Primary Valve Stem 4, prior to the Ridge Fence 32 member, and the Valve End 9, of the Primary Valve Stem 4, communicate the Secondary Stem Bore 26, to the opposite singularly divided portion of the Primary bore 12, where communication is established therebetween the Primary Bore 12, to the Outlet Port 16, by a Outlet Passageway 15, so as a relative conduit is formed, enabling a flow path circumventing the Ridge Fence 32 member, from one singularly divided portion of the Primary Bore 12, to the other continuing between the Inlet Port 6, and the Outlet Port 16.

DETAILED OPERATION OF THE INVENTION

Figure 3:
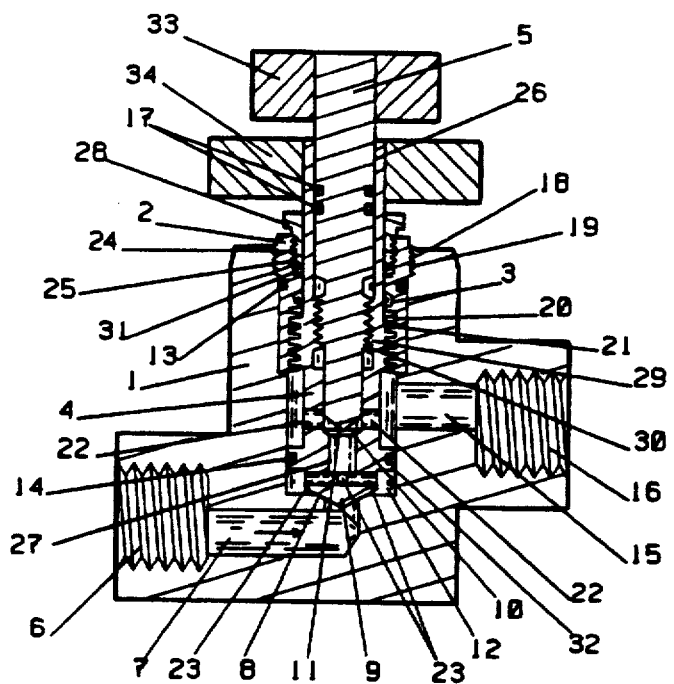

With attention now invited to FIG. 3, of the accompanying drawings, the proposed valve may be coupled by Inlet Port 6, and Outlet Port 16, where in effect, the matter to be controlled flows through the valve in a relative conduit flow path composed of a succession of integrally combined and specifically arranged components, entering Inlet Port 6, and flowing through Inlet Passageway 7, towards the Primary Valve Seat 8, where if the Valve End 9, of Primary Valve Stem 4, is communicating the Primary Valve Seat 8, in a closed position, further ongoing flow is prevented and isolated from entering within the Primary Bore.

Continuance of ongoing flow, in the first stage of operation, is dependent upon the Primary Valve Stem 4, being rotatably positioned within the Primary Bore 12, to a open position, with attention now invited to FIG. 4, of the accompanying drawings, allowing ongoing flow within a path then continuing through the hollow area of the Primary Valve Seat 8, through the distance then existing between the Primary Valve Seat 8, and the Valve End 9, of the Primary Valve Stem 4, into the one lower singularly divided portion of the Primary Bore 12, then continuing within the interior of the Primary Valve Stem 4, through the series of Inlet Bores 23, and central Transfer Bore 27, to further continue through the hollow area of the Secondary Valve Seat 10, and through the distance existing between the Secondary Valve Seat 10, and the Valve End 11, of the Secondary Valve Stem 5, into the Secondary Stem Bore 26, then continuing through the Outlet Bores 22, into the other separate pre-divided portion of the Primary Bore 12, and continuing through the Outlet Passageway 15, and Outlet Port 16.

The rate of flow through the valve, in the second stage of operation, may be independently readily varied by controlled restriction imposed on the flow in passing through the distance between the Secondary Valve Seat 10, and Valve End 11, of the Secondary Valve Stem 5, where the distance between the Secondary Valve Seat 10, and the Valve End 11, of the Secondary Valve Stem 5, may be separately varied, by turning the Stem Handle 33, thereby spiraling the Secondary Valve Stem 5, and Valve End 11, thereon, in towards, or outward away from, the Secondary Valve Seat 10, depending upon the direction of rotation. The fine precise control setting of the flow rate provided by the Secondary Valve Stem 5, may remain completely independently free of extraneous movement assuring the exact precise control setting will be accurately preserved until it has been intentionally reset. Positioning of the Primary Valve Stem 4, to initiate ongoing flow is fully intended to be continually immediately repeatable, and could generally be accomplished by rotating the Primary Valve Stem 4, to the full extent of the Inner Threads 20, within the Sleeve 2, to enable acceptable operation of the device in similarly reinstating a desired flow, however the positioning of the Primary Valve Stem 4, may be more precisely governed by the Stop 3, so as to limit axil movement of the Primary Valve Stem 4, to the extent provided by the Stop 3, located within the Sleeve 2, to assure exact positioning of the Primary Valve Stem 4, may be continually immediately reobtainable, systematically enabling, ongoing flow through the proposed valve to be readily precisely variable, and when terminated, may be spontaneously reinstatable at the substantially exact precise same rate of flow prior to termination, when flow is resumed.

Flow is not limited to a particular direction of travel, as similar results can be achieved if the flow is reversed through the valve.

The foregoing is considered as illustrative only of the principals of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A dual control stem valve, to be universally installed for the staged control of a flow of matter including; a valve body having a couplable inlet port and outlet port, a substantially elongated primary bore being generally centrally disposed in said valve body opening to the outside and terminating within said valve body connecting a hollow primary valve seat arrangement enabling through flow therebetween, said primary bore having a accessible substantially elongated primary valve stem received therein rotatably threadedly secured within said primary bore allowing a means for positioning to be attached thereto, said primary valve stem being rotatably longitudinally positional in said primary bore comprising a impassable valve end immediately communicatable to said primary valve seat arrangement where communication of said primary valve stem valve end to said primary valve seat arrangement positively shuts off flow from continuing therethrough, said primary valve stem having a substantially elongated secondary stem bore opening to the outside of the accessible outer end of said primary valve stem longitudinally disposed within said primary valve stem terminating connecting a hollow secondary valve seat arrangement enabling through flow therebetween, said primary valve stem having a ridge fence member thereon nearing said primary valve stem valve end longitudinally dividing said primary bore into separate portions composing chambers, said inlet port communicating to said primary valve seat arrangement where said primary valve stem can rotatably positionally be disposed to prevent flow through said primary valve seat arrangement, or accordingly, can rotatably positionally be disposed to permit the transfer of flow through said primary valve seat arrangement therebetween one separate portion of said primary bore individually therein communicating a series of inlet bores comprising an opening within said primary valve stem allowing the transfer of flow therebetween a transfer bore within said primary valve stem connecting said secondary valve seat arrangement, said secondary stem bore having a accessible substantially elongated secondary valve stem received therein rotatably threadedly secured in said secondary stem bore allowing a means for positioning to be attached thereto, said secondary valve stem being rotatably longitudinally positional in said secondary stem bore comprising a valve end immediately communicatable to said secondary valve seat arrangement independently varying through flow transferring thereinbetween said secondary valve seat arrangement and said secondary stem bore, said secondary stem bore communicating a series of outlet bores comprising an opening within said primary valve stem allowing the transfer of flow therebetween the other one separate portion of said primary bore individually communicating to said outlet port to complete a through flow path between said inlet port and said outlet port.

2. The structure of claim 1, and a cylindrical hollow sleeve rotatably threadedly secured in a fixed position in said primary bore, said primary valve stem being rotatably threadedly secured in said sleeve, said sleeve extending longitudinally to near midway in said primary bore from the opening, said primary valve stem continuing beyond said sleeve into said primary bore and extending outward through the outer opening of said sleeve.

3. The structure of claim 2, and a hollow packing nut enclosing said primary valve stem being rotatably threadedly secured within the outer opening of said sleeve compressing a suitable packing material into sealing engagement with said primary valve stem.

4. The structure of claim 3, and a resilient o-ring slightly recessed into the outer circumference of said sleeve in sealing engagement with said primary bore inner wall.

5. The structure of claim 2, wherein, said primary bore extends linearly into said valve body until near midway from the opening and then slightly narrows in diameter, said primary valve stem there within the slightly narrower diameter of said primary bore having said ridge fence member thereon.

6. The structure of claim 5, and a resilient o-ring slightly recessed into the outer circumference of said ridge fence member in sealing engagement with said primary bore inner wall.

7. The structure of claim 1, and a pair of o-rings slightly recessed into the outer circumference of said secondary valve stem in sealing engagement with secondary stem bore wall nearing the opening.

* * * * *

UNITED STATES PATENT AND TRADEMARK OFFICE
CERTIFICATE OF CORRECTION

PATENT NO. : 5,141,027
DATED : August 25, 1992
INVENTOR(S) : Peter L. Magnasco

It is certified that error appears in the above-identified patent and that said Letters Patent is hereby corrected as shown below:

Column 3,
Line 6, change "line 3-3" to line -- 3.4 --."
Line 8, change "line 4-4" to line -- 3.4 --."
Line 59, change "Outer Threads 18" to "-- Outer Threads 19 --."
Line 59, change "Inner Threads 19" to "-- Inner Threads 18 --."

Column 5,
Line 12, insert the words and numerals "-- the Valve End 9, is impassable --" before the word "in."
Line 14, insert the numeral "-- 12 --" after the words "Primary Bore."

Column 6,
Line 51, change "comprising" to "-- composing --."
Line 66, change "comprising" to "-- composing --."

Signed and Sealed this

Fourteenth Day of August, 2001

*Attest:*

NICHOLAS P. GODICI
*Attesting Officer*    Acting Director of the United States Patent and Trademark Office